Feb. 11, 1941.　　　　D. BENSEL　　　　2,231,791
PROCESS FOR PRESERVING FOOD
Filed July 31, 1940　　　2 Sheets-Sheet 1
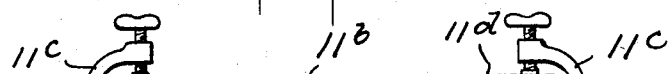
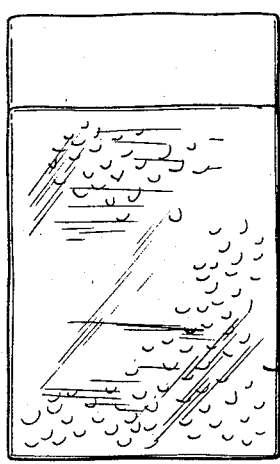
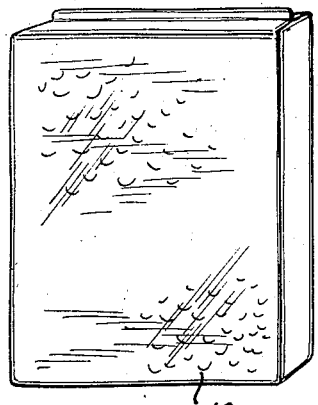
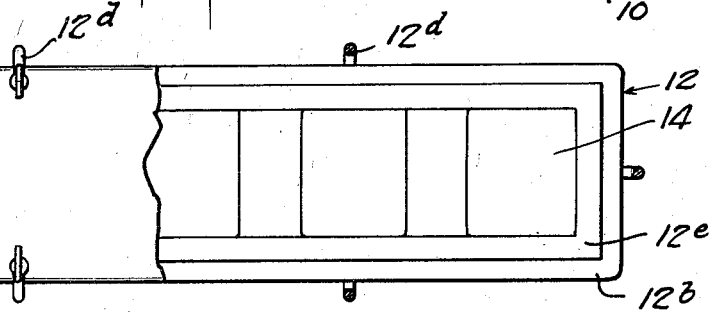
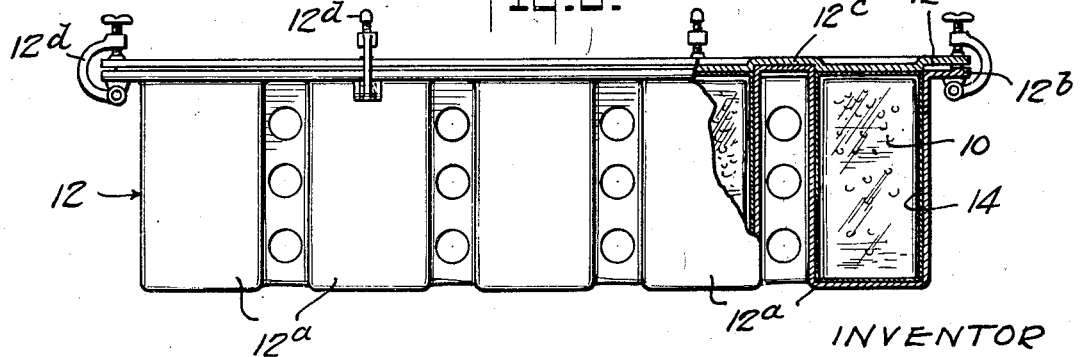
INVENTOR
DURYEA BENSEL
BY
Anderson + Liddy
ATTORNEYS Feb. 11, 1941.                D. BENSEL                2,231,791
                      PROCESS FOR PRESERVING FOOD
                Filed July 31, 1940            2 Sheets-Sheet 2
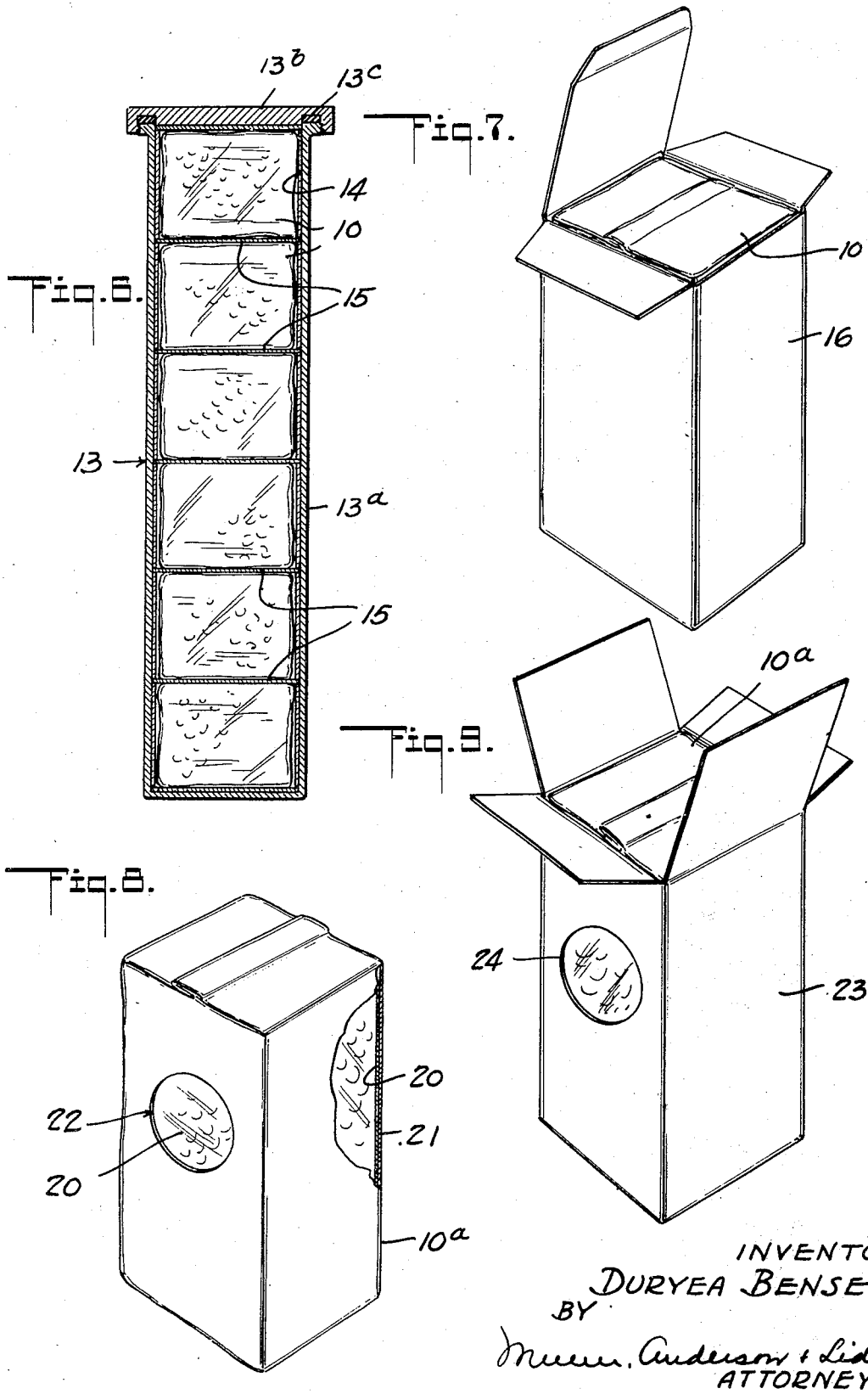
INVENTOR
DURYEA BENSEL
BY
Anderson + Liddy
ATTORNEYS Patented Feb. 11, 1941

2,231,791

UNITED STATES PATENT OFFICE 2,231,791

PROCESS FOR PRESERVING FOOD

Duryea Bensel, Los Angeles, Calif., assignor to Bensel-Brice Corporation, Los Angeles, Calif., a corporation of California Application July 31, 1940, Serial No. 348,872

10 Claims. (Cl. 99—186)

This invention relates generally to the preserving art, and, more particularly, to the preservation of fresh foods and other perishable products. This application is a continuation-in-part of my copending application No. 270,111 filed April 26, 1939.

An object of this invention is to provide a process which dispenses with containers such as tin cans and glass jars, and which utilizes an inexpensive, lightweight, durable and attractive container in which such foods as vegetables, fruits, fish, shellfish, meats, or fowl, for example, at present packed by either cold pack, open kettle or dry pack methods in expensive metal and glass containers, can be preserved indefinitely without deterioration.

Another object of the invention is to provide a preserving process in which an inner container directly receiving the food to be preserved is of such nature as to be structurally incapable of retaining its form during the cooking operation, and is confined in a structurally strong outer cooking container in a manner to be effectively supported thereby against distortion, expansion or other dimensional or physical change which would cause excessive stretching, rupture or other structural failure of the inner container.

A further object of the invention is to provide a preserving process in which the inner food container is either placed in a carrier container or surrounded by a suitable liner in the cooking container to prevent the material of the inner container from sticking to the cooking container under the action of heat applied to the latter for cooking the product.

With these and other objects in view, the invention resides in the process as set forth in the following specification and particularly pointed out in the appended claims.

In the accompanying drawings,

Figure 1 is a view in side elevation of an inner container utilized in the preserving process, and supplied with a fresh food product;

Figure 2 is a view similar to Figure 1, with the inner container sealed airtight;

Figure 3 is a vertical sectional view illustrating a single type cooking container with an inner container pressure-sealed therein;

Figure 4 is a plan view, partly broken away, of a multiple type cooking container for handling inner containers in quantity;

Figure 5 is a view in side elevation, partly in section, of the cooking container shown in Figure 4;

Figure 6 is a vertical sectional view of a modified form of multiple type cooking container;

Figure 7 is a perspective view of the inner container enclosed by a carrier container to form a complete package;

Figure 8 is a perspective view of a laminated form of inner container which is utilized in the preserving process;

Figure 9 is a perspective view of the laminated form of inner container enclosed by a carrier container.

In carrying the invention into practice, the product to be preserved is first thoroughly cleaned, cut to size if necessary, and then partially cooked in an open pot. The correct amount of the product is then placed in an inner container or bag 10 as shown in Figures 1 to 5, inclusive. This container may be constructed of a sheet material such as chlorinated rubber, known commercially as "Pliofilm," which is light, flexible, transparent and free from porosity, as well as being sealable by heat and pressure. Other suitable transparent or opaque flexible, impervious materials can be used, of which one is known as "Diaphane," a heat-sealing paper product, comprising glassine, or, preferably, vegetable parchment rendered impervious by a flexible impregnating coating comprising a wax and/or a resin and a plasticizer. Other suitable flexible, impervious sheet materials may be of several general types such as organic esters of cellulose or cellulose ethers, rendered impervious, if necessary because of their hygroscopic tendencies, by a suitable flexible coating comprising a wax and/or a resin or a coating composition having latex as a basic ingredient, polyvinyl films, such as the vinyl chloride films known commercially as "Koroseal" or "Vinylite," or polyamide films, such as the film known commercially as Nylon.

The inner container 10 is now hermetically sealed by pressure and heat of a temperature approximately 300° Fahrenheit and, preferably, with a suitable heat sealing machine. A single inner container is placed in an outer cooking container 11 (Figure 3) which can be of metal or oven glass. In quantity operation, a number of the inner containers are placed in either the multiple type outer cooking container 12 or 13, as shown in Figures 5 and 6, respectively.

The cooking container 11 is in the form of a cup 11a having a cover 11b which can be secured thereto by suitable clamps 11c and sealed water and air tight by a gasket 11d. The multiple type container 12 is constructed of a number of cups 12a connected at their upper open ends by a flange 12b so as to be rigidly supported and spaced from each other for the free circulation of cooking liquid or vapour therebetween. A cover 12c is adapted to be secured to the flange 12b by suitable clamps 12d, and a gasket 12e is provided to enable the cups to be sealed air and water-tight.

The other type of multiple cooking container 13 is in the form of a relatively deep cup 13a in which several of the inner containers 10 are adapted to be placed in a stack, and to be sealed therein air- and water-tight by a screw-threaded cover 13b and a gasket 13c.

With the use of "Pliofilm" or material of a similar nature for the inner container 10, which, when heated, tends to adhere to the cooking container, a paper liner 14 (Figures 3, 5 and 6) is interposed between the containers, and a paper separator 15 (Figure 6) is interposed between the containers 10 of a stack in the multiple cooking container 13. The liners 14 and 15 are not necessary when the inner containers are each placed in non-adherent carrier containers before being placed in the cooking vessel or when the inner container 10 is made of flexible, impervious sheet material which is non-adherent to walls of the cooking container.

It is to be particularly noted that the internal dimensions of the outer cooking containers are only large enough to receive freely the filled and sealed inner containers 10. In practice a space of 1/8" to 1/4" has been found suitable. The inner containers, which are not self-supporting and are so flexible as to stretch and ultimately burst when subjected to cooking heat and the resulting internal pressure, are thus confined to a limited amount of expansion in any direction. The restricted expansion permitted is not sufficient to stretch the inner container to an extent which would cause rupture or excessive weakening of the inner containers.

After being sealed air- and water-tight by its cover and gasket, the cooking container 11, 12 or 13 is placed in a boiler or retort, such as is now used for the processing of cans and jars, and is subjected to a cooking temperature until the product is thoroughly cooked, following which the container is cooled quickly in cold circulating water. The cooking container is then unsealed and the inner containers removed and placed in structurally strong carrier containers 16 constructed of any suitable rigid board or chip board.

By this process of cooking the product in hermetically sealed "Pliofilm" bags confined in the cooking container, the desirable transparency of the "Pliofilm" is retained, as the bag is subjected only on the inside to the clouding action of the boiling liquid content of the product in the bag. Furthermore, by boiling the bag in this manner, the tensile strength of the material is considerably increased, thus greatly increasing the structural strength of the package.

When using the cold pack method, the product is prepared as above described and placed in the inner containers 10 in a cold or raw state, with the necessary amount of water and/or seasoning added, as the product may require.

The filled and sealed containers 10 are now placed in the carrier containers 16, and the latter are then placed in the cooking container 11, 12, or 13. The cooking container is sealed air- and water-tight and placed in a suitable boiler or retort for cooking until the food product is thoroughly cooked and sterilized. The cooking container is then quickly cooled, after which the complete packages are ready for the shipping receptacle.

In lieu of the paper liner 14 and paper separator 15, the inner container 10a can be constructed of a laminated sheet, as shown in Figure 8, the inner ply 20 being "Pliofilm" and being protected against sticking to the cooking container by the outer ply 21 of paper or other suitable non-adhering material. The outer ply can have suitably spaced and shaped openings 22 to display the product through the window thus formed by the transparent inner ply.

Such laminated containers 10a when filled and sealed can be subjected to the open kettle or cold pack process, and are placed in the cooking container for processing in the manner previously described. After the cooking and cooling operations, the containers 10a can be placed in suitable rigid carrier containers 23 having openings 24 adapted to register with the openings 22, or can be sold in the containers 10a as a cheaper package.

Products that require cooking in a partial vacuum, commercially known as dry pack, are placed in the inner containers 10 and the required vacuum drawn, following which such containers are hermetically sealed. The filled and sealed inner containers are placed in the cooking containers, 11, 12, or 13, and the latter then placed in a retort, pressure cooker or boiler, and allowed to remain until the product is sufficiently cooked, following which the inner containers are cooled and removed from the cooking containers.

The metal or oven glass cooking containers can be steam-jacketed for the cooking operation by live steam. An important feature of the process is the dimensional relationship of the cooking containers to the inner containers 10 by which the product hermetically sealed in the latter can be cooked without rupturing the relatively fragile and flexible inner containers, without destroying its transparency or flexibility, and actually increasing its tensile strength.

Furthermore, as the cooking container limits the inner container, and hence the product therein, to very little expansion, maximum heat and pressure are set up within the inner container, which aids in processing and sterilizing the product in a manner similar to that obtained by using a pressure cooker or retort in which products are directly placed.

It should be apparent from the foregoing that in performing the process described herein that the inner containers 10 and 10a may be made of any suitable flexible, impervious materials and may be placed in the carrier containers 16 either before the inner containers 10 or 10a are processed in the cooking containers 11, 12, or 13 or after the inner containers have been so processed, regardless of whether the food product is packed by either the open kettle, cold pack, or dry pack methods. It should be apparent also that the carrier containers may be provided with suitable windows 24 when the inner container 10 is of transparent single ply material as well as when the laminated inner container 10a is employed. Also a suitable overwrap of "Cellophane" or like wrapping material may be applied to the carrier container 16 when it seems desirable.

The process as above described produces a product which is ideal for heating and serving in the home. It is only necessary to place the inner containers of various products in a vessel of boiling water and permit them to remain for a few minutes, after which the heat is cut off from the vessel and the vessel covered. In about ten minutes the hermetically sealed products in the inner containers are thoroughly heated and ready to serve by opening the containers and placing the contents in serving dishes.

The process embodied in this invention produces a product which entirely eliminates the use of can openers and other devices, which, in many instances, deposit metal particles from the can into its contents during the opening operation, with the attendant danger of causing serious injury if such particles of metal are eaten with the food.

Foods preserved by this process will retain a more natural flavor with the correct amount of natural juices and apparently retain their vitamin content as well as all other beneficial properties of fresh foods.

From the foregoing, it is apparent that this process is not limited to the particular embodiments disclosed but may be modified, either in whole or in part, within the scope of the appended claims to meet the requirements of the particular food products which are to be preserved and the characteristics of the particular materials of which the inner container may be made.

What is claimed is:

1. The process of preserving fresh food products which comprises placing the cleaned fresh food product in an inner container of flexible, impervious material capable of being heat-sealed; heat-sealing the inner container air-tight; placing the filled and sealed inner container in a liquid-free rigid fluid sealing cooking container which confines the inner container to such limited expansion by internal pressure and heat resulting from boiling the contents of the inner container that rupture and structural weakening of the inner container will be prevented; subjecting the cooking container to heat sufficient to cook the product in the inner container; and cooling the cooking container while maintaining the cooking container sealed.

2. The process of preserving fresh food products which comprises placing the cleaned fresh food product in an inner container of flexible, impervious material capable of being heat-sealed; heat-sealing the inner container air-tight; placing the filled and sealed inner container in a rigid fluid sealing cooking container which is liquid-free and confines the inner container to such limited expansion by internal pressure and heat resulting from boiling the contents of the inner container that rupture and structural weakening of the inner container will be prevented; interposing a non-adhering liner between the inner container and the cooking container to prevent the inner container from adhering to the cooking container when the contents of the inner container are heated; sealing the cooking container pressure-tight; subjecting the cooking container to heat sufficient to cook the product in the inner container; and subjecting the cooking container to a cooling agent to cool the product quickly while maintaining the cooking container sealed.

3. The process of preserving fresh food products which comprises partially cooking the cleaned fresh food product in an open vessel; placing the partially cooked product in an inner container of flexible, impervious material capable of being hermetically sealed; heat-sealing the inner container air-tight; fluid pressure sealing the inner container in a rigid cooking container which confines the inner container to such limited expansion and stretching by internal pressure and heat resulting from boiling the contents of the inner container that rupture and structural weakening of the inner container will be prevented; subjecting the cooking container to heat sufficient to cook the product in the inner container; and quickly cooling the cooking container.

4. The process of preserving fresh food products which comprises placing the cleaned food product in an inner container of flexible, impervious material capable of being hermetically sealed; heat-sealing the inner container air-tight; placing the filled and sealed inner container in a structurally strong carrier container which is non-adherent to a cooking container under the action of heat; placing the carrier container in a cooking container and sealing the cooking container fluid and pressure tight; the inner container being confined by the cooking container against rupture and structural weakening when the inner container is subjected to internal pressure and heat by boiling the contents of the inner container; subjecting the cooking container to heat sufficient to cook the product while maintaining the same sealed fluid and pressure tight; quickly cooling the cooking container; and then removing the carrier container from the cooking container.

5. The process of preserving fresh food products which comprises placing the cleaned fresh food product in an inner container of flexible, impervious material capable of being heat-sealed; heat-sealing the inner container air-tight; placing the filled and sealed inner container in a cooking container, against the internal walls of which the inner container will be expanded before the inner container is ruptured or structurally weakened by stretching under internal pressure caused by boiling the contents of the inner container; sealing the cooking container fluid pressure tight; and subjecting the cooking container to heat sufficient to cook the product in the inner container.

6. The process of preserving fresh food products which comprises placing the cleaned food product in an inner container of chlorinated rubber; heat-sealing the inner container air-tight; placing the filled and sealed inner container in a cooking container, the internal dimensions of which will confine the inner container against rupture due to excessive expansion of the inner container caused by boiling the contents of said inner container; surrounding the inner container with a substance non-adherent to the inner container to prevent the inner container from sticking to the cooking container when heated; sealing the cooking container pressure tight; and subjecting the cooking container to heat sufficient to cook the product in the inner container.

7. The process of preserving fresh food products which comprises placing the cleaned food product in a laminated inner container composed of an inner ply of "Pliofilm" and an outer ply of a substance non-adherent to the walls of a cooking container under the heat of boiling the contents of the inner container; heat-sealing the inner container air-tight; placing the filled and sealed inner container in a cooking container which confines the inner container against rupture by expansion from boiling its contents; sealing the cooking container pressure tight; and subjecting the cooking container to sufficient heat to cook the product in the inner container.

8. The process of preserving food products which comprises the steps of placing a food product in an inner container of flexible, impervious sheet material capable of being heat sealed; hermetically sealing said inner container; closely confining said inner container in a cooking container; hermetically sealing said cooking container to limit the expansion of the inner container under the internal pressure caused by cooking the contents of the inner container; and subjecting the cooking container to a cooking temperature.

9. The process of preserving food products which comprises the steps of placing the food product in a flexible, impervious inner container of polyvinyl film; hermetically sealing the food product in the inner container; placing the filled and sealed inner container in a cooking container, the internal walls of which will confine the inner container against rupture due to expansion of the inner container caused by cooking the contents of said sealed inner container; sealing the cooking container pressure-tight; and subjecting the cooking container to temperature sufficient to cook the food product within the inner container.

10. The process of preserving food products which comprises the steps of placing the food product in a flexible, impervious inner container of polyamide film; hermetically sealing the food product in the inner container; placing the filled and sealed inner container in a cooking container, the internal walls of which will confine the inner container against rupture due to expansion of the inner container caused by cooking the contents of said sealed inner container; sealing the cooking container pressure-tight; and subjecting the cooking container to temperatures sufficient to cook the food product within the inner container.

DURYEA BENSEL.